F. C. FOSTER.
FUMIGATOR.
APPLICATION FILED OCT. 31, 1910.
1,034,777.
Patented Aug. 6, 1912.
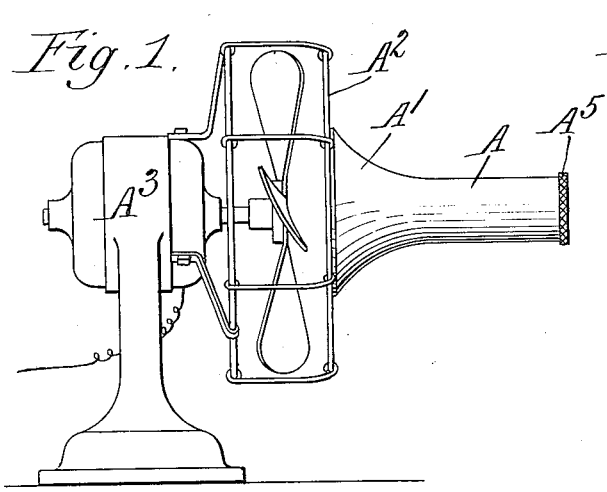
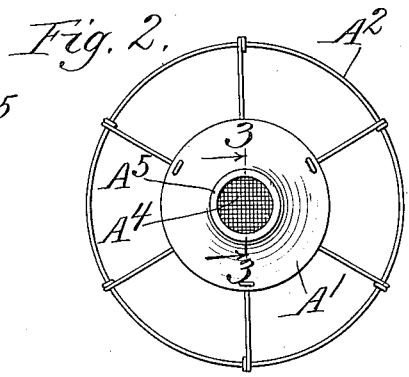
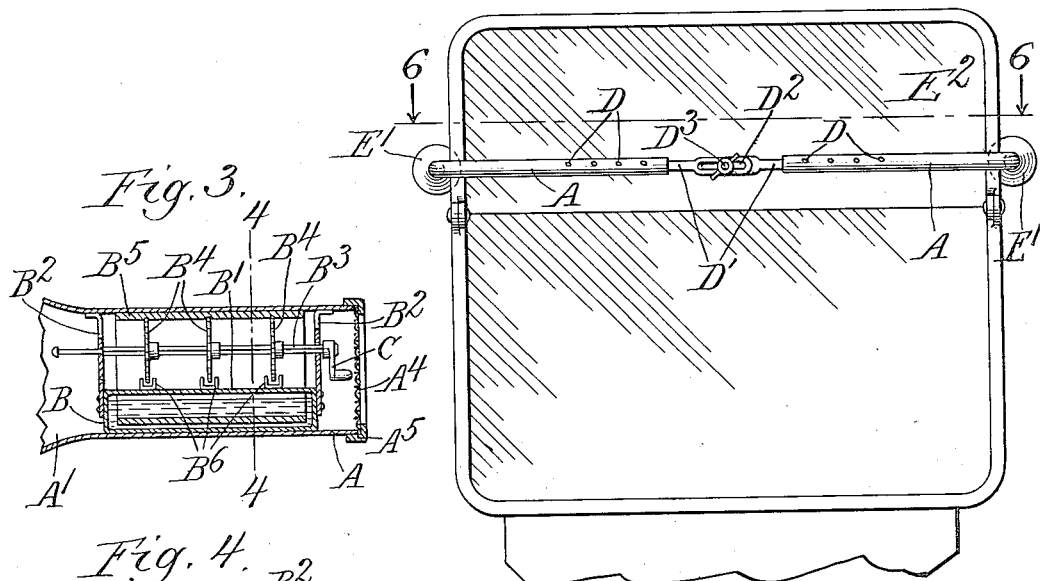
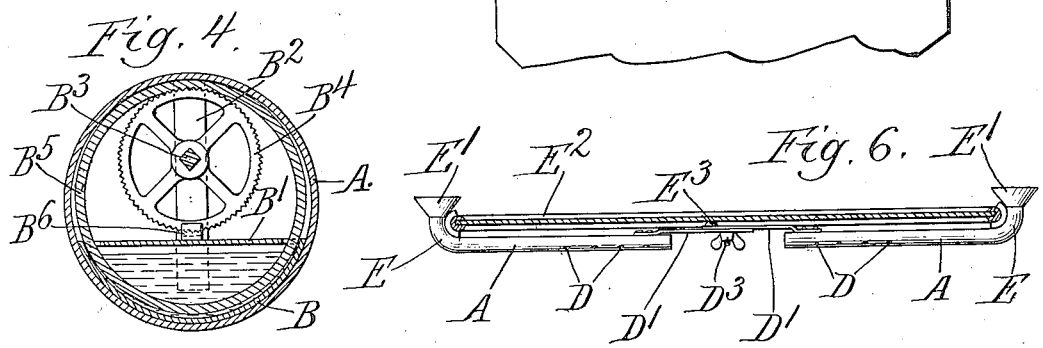
Witnesses.
Edward T. Wray
Sophia B. Werner
Inventor.
Freling C. Foster
by Parker Cole
Attorneys

UNITED STATES PATENT OFFICE.

FRELING C. FOSTER, OF CHICAGO, ILLINOIS, ASSIGNOR OF ONE-THIRD TO FRANK MUNN LILLIE AND ONE-THIRD TO WILLIAM S. NORDBURG, OF CHICAGO, ILLINOIS.

FUMIGATOR.

1,034,777.  Specification of Letters Patent.  Patented Aug. 6, 1912.

Application filed October 31, 1910. Serial No. 589,844.

*To all whom it may concern:*

Be it known that I, FRELING C. FOSTER, a citizen of the United States, residing at Chicago, in the county of Cook and State of Illinois, have invented a certain new and useful Improvement in Fumigators, of which the following is a specification.

My invention relates to improvements in fumigators, and is illustrated diagrammatically in one form in the accompanying drawings, where it is shown applied to an electric fan and to an automobile.

Figure 1 is a side elevation of the device as applied to an electric fan; Fig. 2 is a front elevation of Fig. 1; Fig. 3 is a detail section along the line 3—3 of Fig. 2; Fig. 4, a section along the line 4—4 of Fig. 3; Fig. 5, an elevation of an automobile wind shield showing one form of the device attached thereto; Fig. 6, a section along the line 6—6 of Fig. 5.

Like parts are indicated by like letters throughout the several figures.

The cylindrical tube A which terminates at one end in the funnel $A^1$ is attached to the protecting cage $A^2$ of any suitable electric fan $A^3$ and closed at its other end by the screen $A^4$ carried within the removable cap $A^5$. The receptacle B having the cover $B^1$ fits within the tube A and is provided at either end with the uprights $B^2$, rotatably and slidably mounted upon which is the square shaft $B^3$ carrying the toothed wheels $B^4$ slidably mounted thereon to support the cylindrical wick $B^5$ in a position substantially concentric with the tube A. The cover $B^1$ is provided with the U-shaped guards $B^6$ on either side of the wheels $B^4$ which prevent lateral displacement. The shaft $B^3$ is provided at its outer end with the handle C rigidly fixed thereon, by means of which the shaft $B^3$ and wheels $B^4$ may be rotated.

In the modification illustrated in Figs. 5 and 6, I have shown the cylindrical tubes A perforated at D and connected in pairs end to end by the coupling bars $D^1$, slotted at $D^2$ to engage the thumb screw and nut $D^3$. The opposite ends of the tubes terminate in the elbows E and funnels $E^1$, in engagement with the opposed sides of the wind shield $E^2$. One of the coupling bars is provided with the rubber or fiber button $E^3$ in contact with the glass of the wind shield to prevent rattling or vibration.

It will be evident that while I have shown in my drawings an operative device, still many changes might be made in the size, shape and arrangement of parts, or the application of the device without departing materially from the spirit of my invention, and I wish, therefore, that my drawings be regarded as in a sense diagrammatic.

The use and operation of my invention are as follows: The receptacle is filled with perfumery, disinfectant, or other fluid, with which it is desired to permeate the air, the cap is then removed from the tube and the receptacle inserted therein, the cap is then replaced and the electric fan started, driving a current of air through the tube, which current will pass through the saturated wick and permeate the air with the fluid. If it is desired to more fully saturate the air, the handle is drawn out and the shaft rotated to bring the wet wick out of the receptacle.

In the modification, the air is forced through the tube by the rapid motion of the automobile and passes through the perforations in the walls of the tube and out through the end of the tube and permeates the atmosphere breathed by those in the automobile.

I claim:—

1. A fumigator comprising a tube open at both ends, means for forcing a current of air therethrough, a liquid-containing receptacle therein, a cylindrical wick within and concentric with said tube, toothed wheels upon which said wick is mounted.

2. A fumigator comprising a tube open at both ends, means for forcing a current of air therethrough, a liquid-containing receptacle therein, a cylindrical wick within and concentric with said tube, toothed wheels the teeth of which engage the inner surface of the wick, and means for rotating said wheels and wick.

3. A fumigator comprising a tube open at both ends, means for forcing a current of air therethrough, and a liquid-containing receptacle therein, standards carried by said receptacle, a shaft slidably and rotatably carried by said standards, toothed wheels slidably carried by said shaft and a cylindrical wick carried by said wheels.

4. A fumigator comprising a tube open at both ends, means for forcing a current of air therethrough, and a liquid-containing receptacle therein, standards carried by said receptacle, a shaft slidably and rotatably carried by said standards, toothed wheels slidably carried by said shaft and a cylindrical wick carried by said wheels and means for rotating said shaft.

5. A fumigator comprising a fan having an open cage thereabout, a conical flaring tube terminating in a cylindrical passage and smaller at its largest diameter than the diameter of the fan, said tube being attached to said cage in such manner that the axis of the tube and the axis of rotation of the fan are substantially coincident, a receptacle within said cylindrical extension and liquid saturated material located within said tube and projecting from said receptacle.

6. A fumigator comprising a funnel, a cylindrical extension therefor, a cap at the end of said extension, a liquid containing receptacle within said extension and a hollow cylindrical wick projecting from said receptacle and located within said extension.

7. A fumigator comprising a funnel having a cylindrical extension, a liquid containing receptacle located within said extension, and a tubular wick substantially concentric with said extension and projecting upwardly from said receptacle.

FRELING C. FOSTER.

Witnesses:
FRANCIS W. PARKER, Jr.,
MINNIE M. LINDENAU.